United States Patent [19]
Yoshida et al.

[11] Patent Number: 5,499,510
[45] Date of Patent: Mar. 19, 1996

[54] MULTIPLE TYPE AIR CONDITIONER SYSTEM AND ADDRESS SETTING METHOD THEREOF

[75] Inventors: Satoru Yoshida, Shimizu; Keiji Sato, Shizuoka; Masamichi Mochizuki, Fujinomiya; Masashi Watanabe, Shimizu; Takashi Kato, Fujieda, all of Japan

[73] Assignees: Hitachi, Ltd.; Hitachi Shimizu, Japan

[21] Appl. No.: 308,106

[22] Filed: Sep. 16, 1994

[30] Foreign Application Priority Data

Sep. 20, 1993 [JP] Japan ................................. 5-232795

[51] Int. Cl.⁶ .................................................. F25B 49/02
[52] U.S. Cl. ................................. 62/175; 236/51; 165/22
[58] Field of Search ............................. 62/175, 115, 510; 236/51; 165/12, 22

[56] References Cited

U.S. PATENT DOCUMENTS

| | | | |
|---|---|---|---|
| 4,811,897 | 3/1989 | Kobayashi et al. | 236/51 X |
| 5,207,071 | 5/1993 | Ozu et al. | 62/175 |
| 5,271,453 | 12/1993 | Yoshida et al. | 165/22 |
| 5,279,458 | 1/1994 | DeWolf et al. | 236/51 X |
| 5,390,506 | 2/1995 | Sogabe et al. | 62/175 |

FOREIGN PATENT DOCUMENTS 5-141819  6/1993  Japan.

OTHER PUBLICATIONS

New Saison Air-Conditioner Transmission System, Mitsubishi Heavy Industries, Ltd., Feb. 1990, 3 pages.

*Primary Examiner*—Harry B. Tanner
*Attorney, Agent, or Firm*—Evenson, McKeown, Edwards & Lenahan

[57] ABSTRACT

In a multiple type air conditioner system which includes a plurality of outdoor units and a plurality of indoor units, the plurality of outdoor units are connected with the plurality of indoor units through a communication line, address setting is attained by generating a random address from each of all the indoor units under a command of one of the outdoor units and generating a dummy address from each outdoor unit on the basis of the random address, by obtaining a correlative relationship between the outdoor and indoor units on the basis of a variation of a physical quantity of the outdoor unit connected to the indoor unit actually operated based on the dummy address, and by updating the addresses of all the outdoor and indoor units on the basis of the correlative relationships between all the outdoor and indoor units obtained through the step.

9 Claims, 16 Drawing Sheets

F I G. 15

[GENERAL MESSAGE FORMAT]

| IDENTIFICATION CODE | SORT CODE | LENGTH | OWN GROUP ADDRESS | OWN UNIT ADDRESS | PARTY GROUP ADDRESS |
|---|---|---|---|---|---|

| PARTY UNIT ADDRESS | DATA | BCC |
|---|---|---|

[RANDOM ADDRESS GENERATION REQUEST]

| IDENTIFICATION CODE 32 | SORT CODE 01 | LENGTH 08 | OWN ADDRESS 01 00 | PARTY ADDRESS 00 00 | BCC |
|---|---|---|---|---|---|

[ADDRESS REPORT MESSAGE]

| IDENTIFICATION CODE 32 | SORT CODE 02 | LENGTH 08 | OWN ADDRESS 01 26 | PARTY ADDRESS 01 00 | BCC |
|---|---|---|---|---|---|

[ADDRESS CHANGE REQUEST MESSAGE]

| IDENTIFICATION CODE 23 | SORT CODE 03 | LENGTH 0A | OWN ADDRESS 01 00 | PARTY ADDRESS 00 26 | CHANGE ADDRESS 00 02 | BCC |
|---|---|---|---|---|---|---|

[OPERATION REPORT MESSAGE]

| IDENTIFICATION CODE 23 | SORT CODE 04 | LENGTH 08 | OWN ADDRESS 01 00 | PARTY ADDRESS 00 00 | BCC |
|---|---|---|---|---|---|

[CONNECTION REPORT MESSAGE]

| IDENTIFICATION CODE 32 | SORT CODE 05 | LENGTH 08 | OWN ADDRESS 00 02 | PARTY ADDRESS 01 00 | BCC |
|---|---|---|---|---|---|

[STOPPAGE REPORT MESSAGE]

| IDENTIFICATION CODE 23 | SORT CODE 06 | LENGTH 08 | OWN ADDRESS 01 00 | PARTY ADDRESS 00 00 | BCC |
|---|---|---|---|---|---|

[SETTING COMPLETION REPORT MESSAGE]

| IDENTIFICATION CODE 23 | SORT CODE 07 | LENGTH 08 | OWN ADDRESS 01 00 | PARTY ADDRESS 00 00 | BCC |
|---|---|---|---|---|---|

MULTIPLE TYPE AIR CONDITIONER SYSTEM AND ADDRESS SETTING METHOD THEREOF

BACKGROUND OF THE INVENTION

The present invention relates to a multiple type air conditioner system which comprises a plurality of indoor units and a plurality of outdoor units and a method for setting addresses thereof.

In a conventional separator type air conditioner system, each of outdoor and indoor units connected each other by a refrigerant pipe is provided with a controller having a microcomputer and a communication line is connected between the outdoor and indoor units, so that the system is controllably operated while the controllers transmit and receive mutual control information through the communication line. For example, in such a single type air conditioner system comprising a single outdoor unit 1 and a single indoor unit 2 as shown in FIG. 7, connection between the indoor and outdoor units is effected by means of a communication line 3; whereas, in such a multiple type air conditioner system comprising a single outdoor unit 1 and a plurality of indoor units 3 as shown in FIG. 8, connection between indoor and outdoor units is effected by means of a communication line 3.

When it is desired to install a plurality of air conditioners in an identical building, a plurality of outdoor units are installed in many cases on the roof of the building. In such a case, in order to make a total length of communication line as short as possible, there has in these years been employed a system in which interconnection between a plurality of outdoor units 1 and a plurality of indoor units 2 is carried out on a continuous cross wiring basis by means of a communication line 3 as shown in FIG. 9. This connection system is usually known as bus type connection.

In this bus type connection system, even when the outdoor and indoor units have different piping systems, physical communication can be established. In order to control an air conditioner system, it has been necessary for the actual combinations between the outdoor and indoor units in their identical piping system for transferring control information between the outdoor and indoor units in their idential piping system.

Therefore, in order to limit the combinations between the outdoor and indoor units, a number setter is used for setting a group address for each of microcomputer-based controllers of the respective units, the address being able to be read by the associated controller microprocessor. This group address enables transmission and reception of control information between the outdoor and indoor units in the same combination.

A prior art example of such an address setting method for an air conditioner system is described in a catalogue entitled "New Saison Air-Conditioner Transmission System" issued from Mitsubishi Heavy Industries, Ltd. in February, 1990.

Meanwhile, the aforementioned address setting method using the number setter, which address setting is manually carried out, has had disadvantages which follow.

(1) At the time of installing the air conditioner system, an installation worker must set an address on every unit basis while confirming the state of the connection between the outdoor and indoor units, which requires a lot of time.

(2) There is a possibility that a mistake by the installation worker causes an erroneous setting.

Further, a method for performing desired reliable operation of an indoor unit in accordance with a correlation between the indoor unit and a solenoid valve is described in JP-A-5-141819.

SUMMARY OF THE INVENTION

It is an object of the present invention to provide an air conditioner system which comprises a plurality of indoor units and a plurality of outdoor units and which automatically sets addresses for the respective indoor and outdoor units to thereby improve reliability in the units and to realize energy saving thereof and also provide a method for setting addresses for the units.

In accordance with a suitable aspect of the present invention, the above object is attained by providing an air conditioner system which comprises a plurality of outdoor units each having a compressor, an outdoor heat exchanger and a 4-way value and a plurality of indoor units having an expansion means and an indoor heat exchanger, wherein the plurality of outdoor units are serially connected to the plurality of indoor units through a communication line, each of the outdoor units has an outdoor controller, each of the indoor units has an indoor controller, the outdoor controller includes communication means, outdoor control means for performing transmission and reception of a message to and from the other outdoor and indoor units through the communication means, random value generation means for generating a random address under a command of the outdoor control means, and address control means for storing therein the random address, the outdoor controller includes second communication means, indoor control means for performing transmission and reception of a second message to and from the other outdoor units through the communication means, second random value generation means for generating second random address under a command of the indoor control means, and second address control means for storing therein the second random address.

In accordance with another aspect of the present invention, there is provided a multiple type air conditioner system which comprises a plurality of outdoor units and a plurality of indoor units, and wherein the plurality of outdoor units are serially connected with the plurality of indoor units through a transmission line, each of the outdoor and indoor units includes address memory means for storing therein its own address, random address generation means for generating a random address to be stored in the address memory means, and update means for updating the random address stored in the memory means.

In accordance with a further aspect of the present invention, there is provided an address setting method for an air conditioner system comprising a plurality of outdoor units each having outdoor control means, a compressor and physical quantity detection means and a plurality of indoor units each having indoor control means and an expansion value, the plurality of outdoor units being serially connected to the plurality of indoor units through a communication line, the method comprising the steps of generating, under a command of first one of the plurality of outdoor units, a random address from the other outdoor and indoor units; receiving the generated random address at the first outdoor unit; generating a dummy address from the first outdoor unit on the basis of the received random address and assigning the dummy address to the respective outdoor and indoor units; changing opening of the expansion valve of first one of the plurality of indoor units; and causing the control means of the plurality of outdoor units to judge pipe connection with the first indoor unit on the basis of a variation of a physical quantity caused by a variation of the opening of the expansion valve of the first indoor unit and detected by the physical quantity detection means of the outdoor units and to update the dummy address.

In accordance with yet a further aspect of the present invention, there is provided an address setting method for an air conditioner system comprising a plurality of outdoor units each having outdoor control means and a compressor and a plurality of indoor units each having indoor control means and physical quantity detection means, the plurality of outdoor units being serially connected to the plurality of indoor units through a communication line, the method comprising the steps of generating, under a command of first one of the plurality of outdoor units, a random address from the other outdoor and indoor units; receiving the generated random address at the first outdoor unit; generating a dummy address from the first outdoor unit on the basis of the received random address and assigning the dummy address to the respective outdoor and indoor units; causing the control means of the first outdoor unit to operate the compressor of the first outdoor unit; and thereafter causing the control means of the plurality of indoor units to judge pipe connection with the first outdoor unit on the basis of a variation in a physical quantity caused by the compressor and detected by the physical quantity detection means provided in each of the indoor units and to update the dummy address.

In accordance with another aspect of the present invention, there is provided an address control method for a multiple type air conditioner system comprising a plurality of outdoor units and a plurality of indoor units, the plurality of outdoor units being serially connected to the plurality of indoor units through a transmission line, the method comprising the steps of: causing each of the indoor and outdoor units to generate a random address on the basis of a signal generated by one of the outdoor units; operating the outdoor unit having the signal generated therefrom and judging one of the indoor units connected through a refrigerant pipe to the outdoor unit on the basis of an output of physical quantity measurement means provided in each of the respective indoor units; and updating the random address on the basis of a judgement result of the judging step.

In the present invention having such an arrangement as mentioned above, when the installation worker turns ON the switch of one of the outdoor units, the outdoor unit having the switch turned ON is set as a main unit while the other outdoor units and indoor units are set as sub units so that the sub units generate the random addresses. The main unit confirms the absence of the overlapped random addresses, re-arranges the random addresses, changes the random addresses to a series of consecutive numbers to dummy addresses, and stores the dummy addresses in the respective indoor and outdoor units. Next, when the compressor of the main unit is driven, this causes variation of the temperature of the indoor heat exchanger of the indoor unit connected to the main unit via the pipe. As a result, the connection relationship with the main unit can be found. When the compressors of all the outdoor units are operated and the opening degree of the expansion valve of one indoor unit (main unit) is varied, the pressure of the outdoor unit connected to the main unit through the pipe is changed. As a result, the connection relationship with the main unit can be found. The address of the indoor unit is again set on the basis of the found connection relationship. That is, the number of the outdoor unit whose connection has been found is set as the group address of the indoor units. The main unit is replaced by one of the indoor or outdoor units having the next dummy address number and then the above operation is repeated. When the aforementioned procedure is repeated by the number of times corresponding to the number of outdoor units or the number of indoor units, the pipe connection relationships between all the outdoor and indoor units can be found and addresses can be uniquely assigned to the units.

With such an arrangement, since the outdoor and indoor units recognized as mutually connected via the refrigerant pipe have a shared identical group address, automation of the address setting can be realized.

These and other objects and effects and technical advantages of the present invention will be readily apparent from the following detailed description of the preferred exemplary embodiment of the invention in conjunction with the accompanying drawings, in which:

BRIEF DESCRIPTION OF THE DRAWINGS

FIG. 15 shows an example of messages used for address setting.

DESCRIPTION OF THE PREFERRED EMBODIMENTS

An embodiment of the present invention will be detailed with reference to the accompanying drawings.

Figure 1:
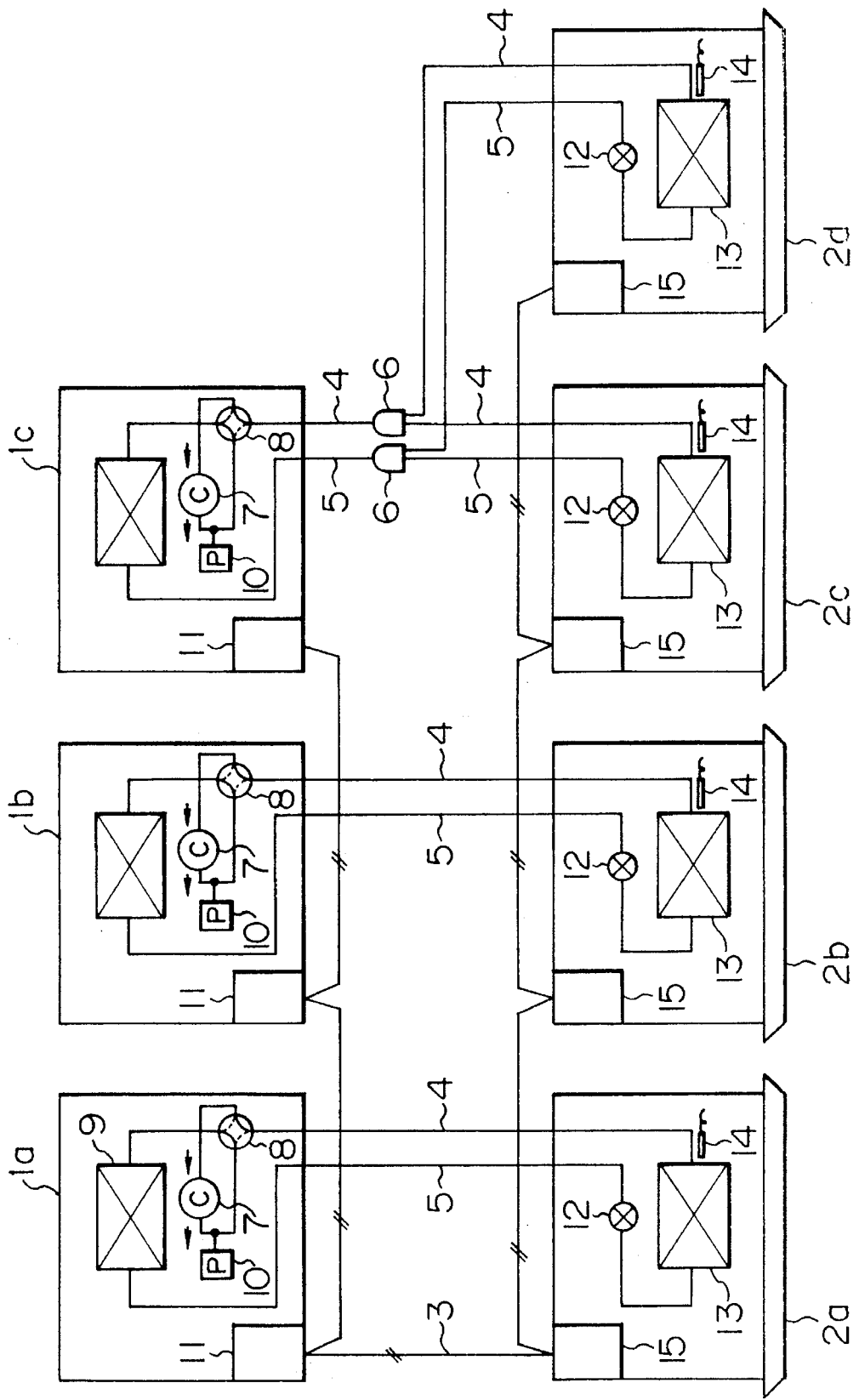
FIG. 1 shows, in a model form, an air conditioner system in accordance with an embodiment of the present invention.

Referring first to FIG. 1, there is shown an arrangement of an air conditioner system in accordance with the present invention. In the present embodiment, 3 outdoor units 1a, 1b, 1c and 4 indoor units 2a, 2b, 2c are wired by a communication line 3 in a bus type connection form. The outdoor and indoor units 1a and 2a and the outdoor and indoor units 1b and 2b, which are all single type air conditioners, are connected by respective refrigerant gas pipes 4 and refrigerant liquid pipes 5 respectively in a 1:1 relationship. Meanwhile, the outdoor an indoor units 1c and 2c and the indoor unit 2d, which are all multiple type air conditioners, are connected by the respective refrigerant gas pipe 4 and refrigerant liquid pipe 5 which are branched at points 6 respectively in a 1:1 relationship. The wiring of the communication line 3, in addition to the collective wiring of the respective outdoor and indoor units as in the present embodiment, may be carried out by means of alternately mixed wiring of the outdoor and indoor units. Further, when the total length of the transmission line is not long (on the order of 50 m), it may be wired in a loop form.

Each of the outdoor units includes a compressor 7, a 4-way change-over valve 8, an outdoor heat exchanger 9, a pressure sensor 10 and an outdoor controller 11. Each of the indoor units, on the other hand, includes an electrically-actuated expansion valve 12, an indoor heat exchanger 13, a temperature sensor 14 and an indoor controller 15. In this connection, parts not associated with the present invention are not shown.

Figure 2:
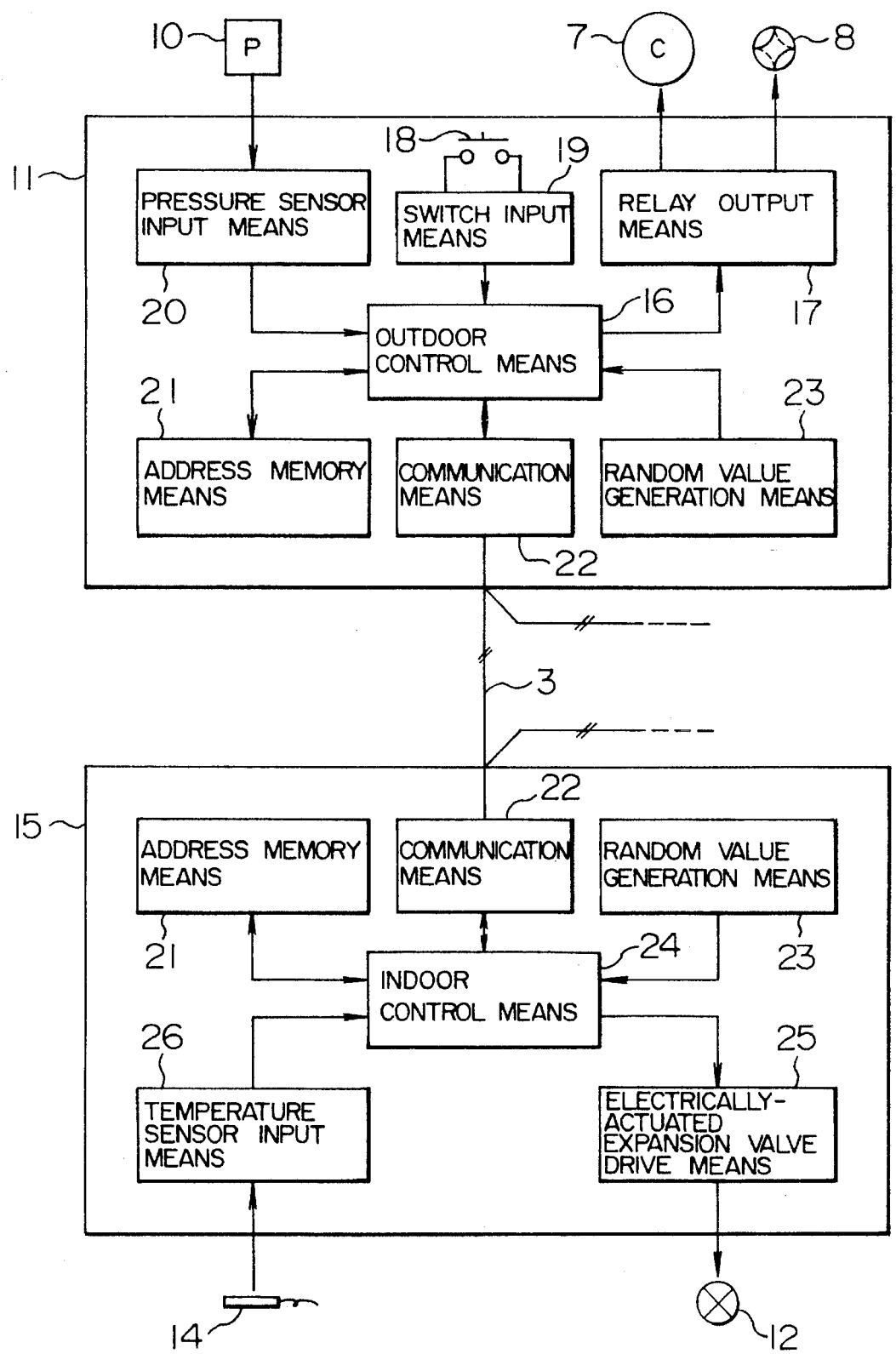
FIG. 2 is a block diagram of a controller used in the system.

Shown in FIG. 2 is a detailed block diagram of the outdoor controller 11 and indoor controller 15.

More in detail, the outdoor controller 11 includes an outdoor control means 16, a relay output means 17 for performing running/stopping operation of the compressor 7, a switch 18 provided within the outdoor controller, a switch input means 19 for reading the ON/OFF state of the switch 18, a pressure sensor input means 20 for reading an output value of the pressure sensor 10, a nonvolatile address memory means 21 for storing therein an automatically set address, a communication means 22 for communicating with the other controllers based on a carrier sense multiple access/collision detection (CSMA/CD) system as a transmission method for performing communication after confirming that the communication line is idle or not occupied, and a random value generation means 23 for generating a dummy address. On the other hand, the indoor controller 15 includes an indoor control means 24 for performing controlling operation over the entire indoor unit in accordance with an internal program, an expansion valve drive means 25 for opening and closing the electrically-actuated expansion valve 12, a temperature sensor input means 26 for reading an output value of the temperature sensor 14, another address memory means 21, another communication means 22, and another random value generation means 23.

Figure 3:
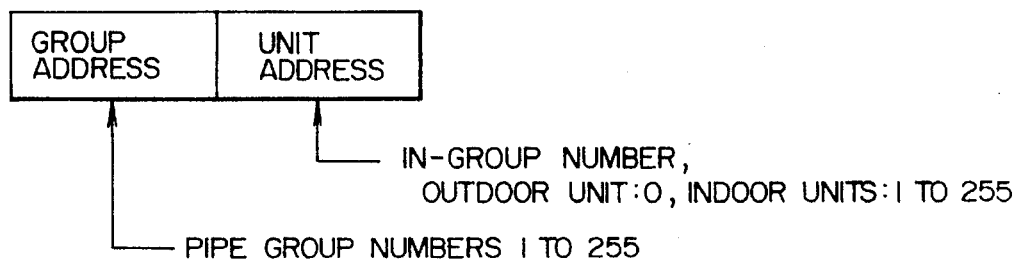
FIG. 3 is a diagram for explaining an address representation format.

FIG. 3 is a diagram for explaining address representation format in which an address is made up of a group address unique to each of piping groups and a unit address unique to each of the units in the associated group. In this case, the word "units" generally refer to the indoor and outdoor units. The unit address of "0" is fixedly assigned to the indoor units and the unit addresses of numbers other than "0" are assigned to the indoor units.

Figure 10A:
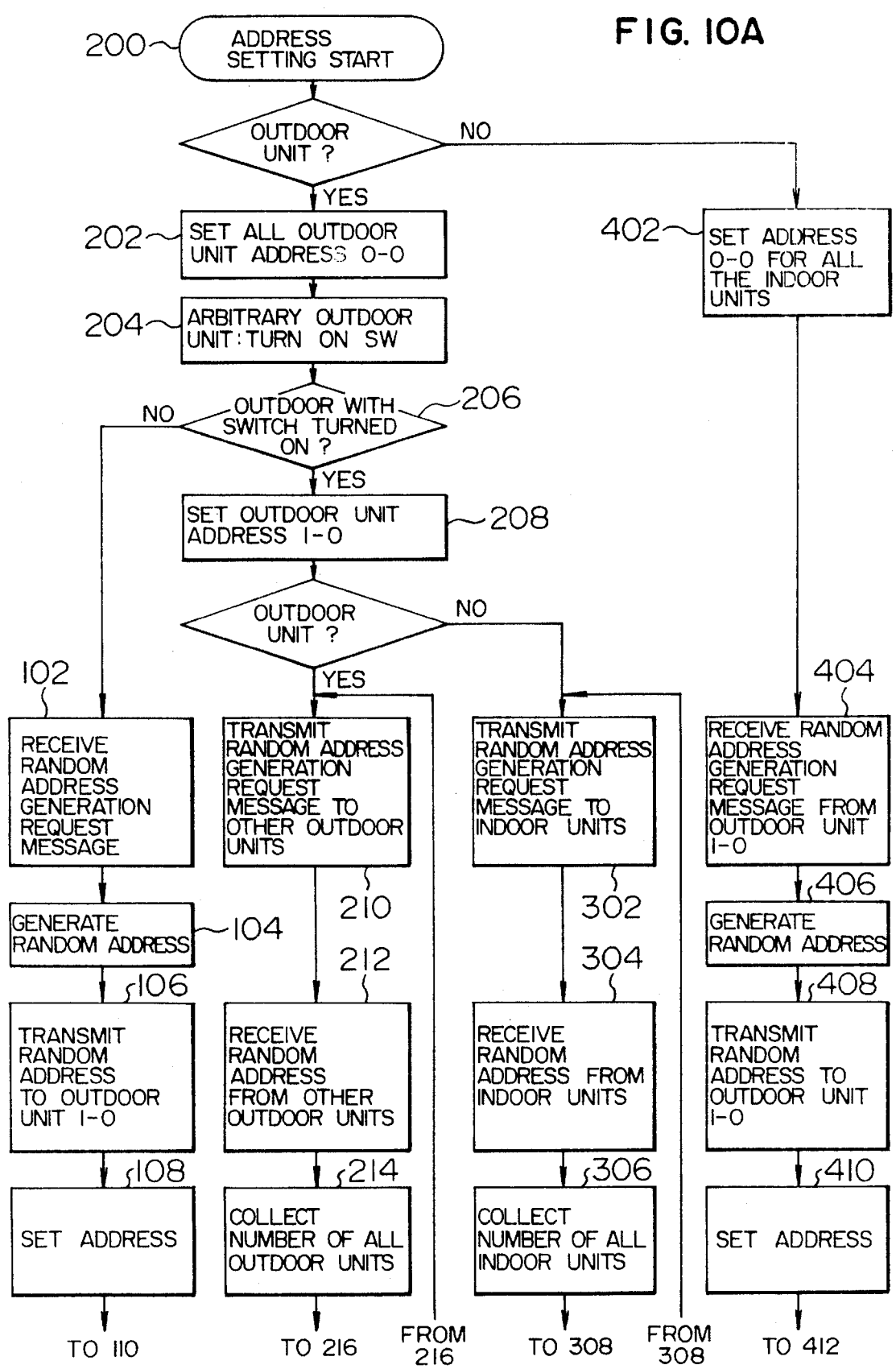
FIGS. 10A and 10B collectively show a flowchart for explaining an address setting method in accordance with the present invention.
Figure 10B:
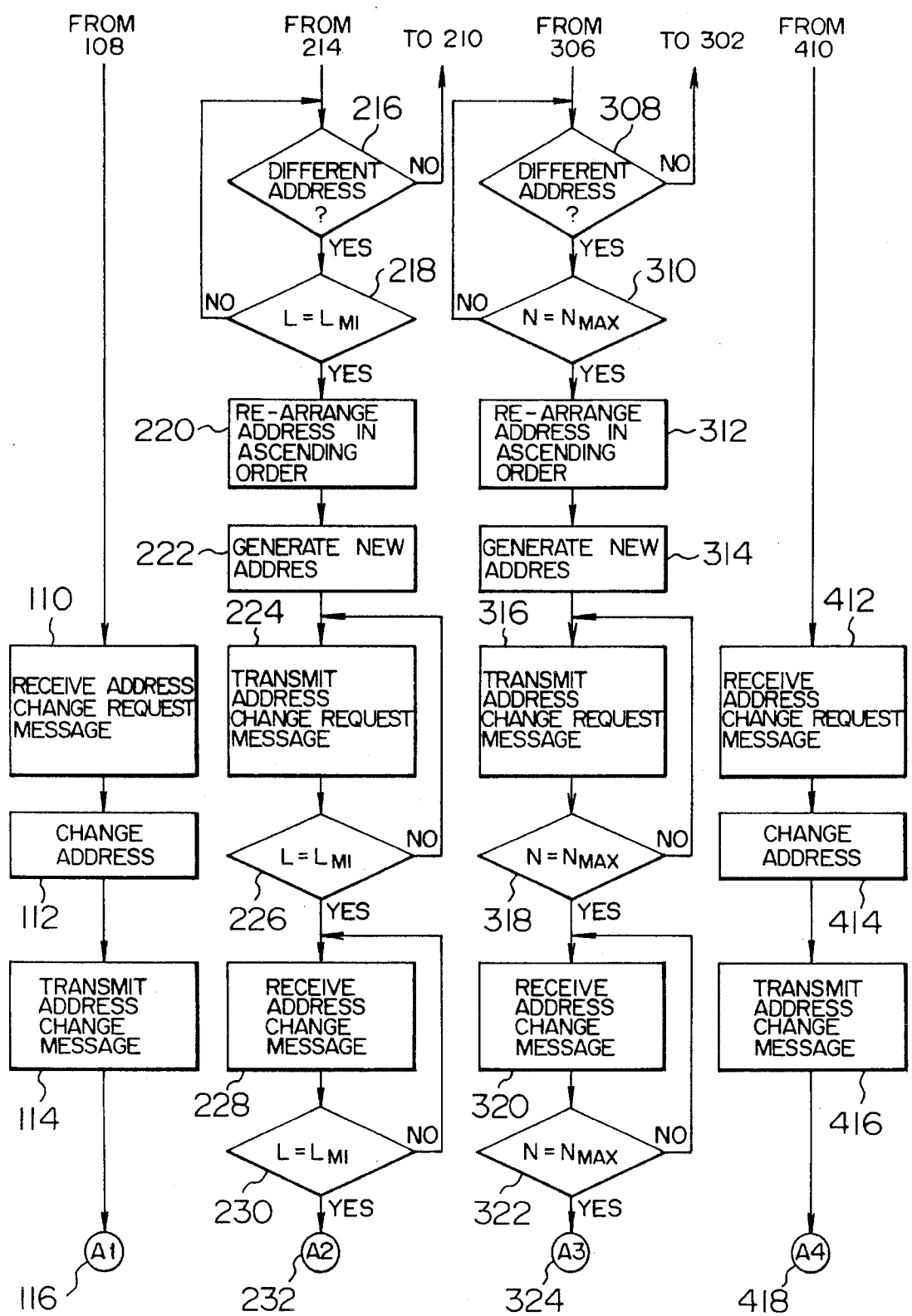

Explanation will next be made as to the automatic address setting operation of the aforementioned air conditioner system having such an arrangement as mentioned above by referring to a flowchart shown in FIGS. 10A and 10B. In this case, steps 204 to 232 show the control part of the other outdoor units during operation of the outdoor control means 16 of the outdoor unit 1-0 switched ON, steps 302 to 324 show the control part of the other indoor units during operation of the outdoor control means 16 of the outdoor unit 1-0 switched ON, steps 102 to 114 show the operation of the outdoor control means 16 of the other outdoor units, and steps 402 to 418 show the operation of the indoor control means 24 of each indoor unit.

When the air conditioner system has been completely installed, the addresses of the indoor and outdoor units are not set yet and thus the group and unit addresses are both "0s", which is expressed by 0-0 (the left "0" as the group address and the right "0" as the unit address).

Figure 4A:
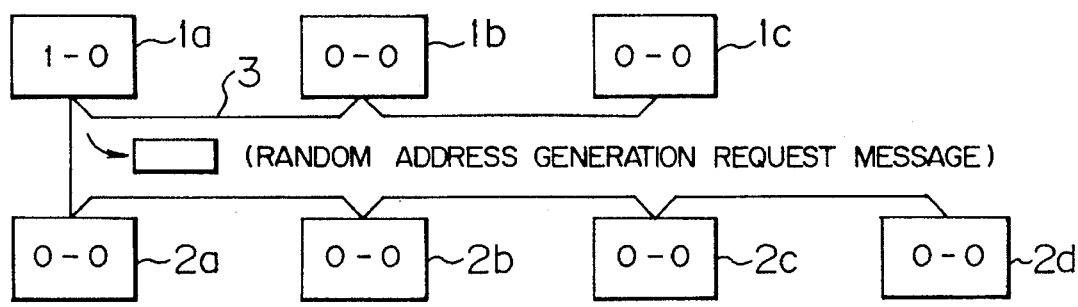
FIG. 4A is a diagram for explaining an operational procedure in the embodiment of the invention.

Automatic address setting operation is started when the user pushes the switch 18 of any one of the outdoor units. The outdoor unit having the switched turned ON sets its own address 1-0 in its own outdoor control means 16, and also transmits a random address generation request message to the other outdoor and indoor units via the communication means 22. At this time, the addresses of the other units are all "0-0" and therefore it is impossible for the switch-ON outdoor unit to specify the other units and to transmit the respective messages thereto individually. For this reason, the switch-ON outdoor unit transmits a broadcast message to all the units. In the illustrated case, the outdoor control means 16 is divided into a part for transmission and reception of the message to and from the other outdoor units and a part for transmission and reception of the message to and from the other indoor units. The broadcast message is transmitted through these parts. FIG. 4A shows the states of the specific indoor and outdoor units when the switch of the outdoor unit 1a is pushed.

Figure 4B:
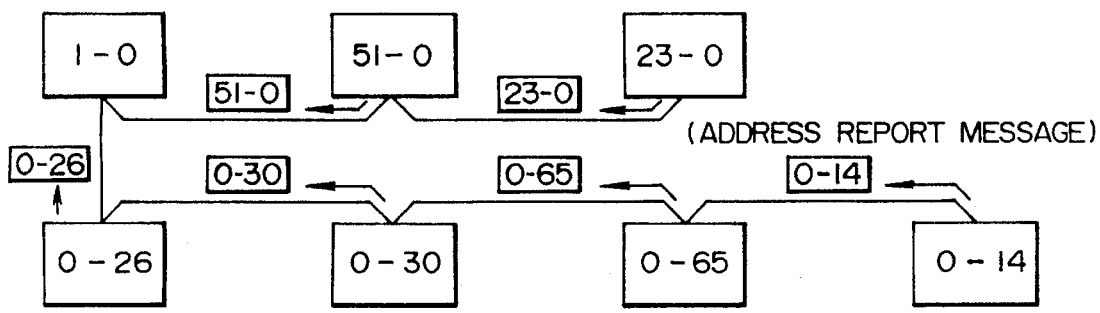
FIG. 4B is a diagram for explaining an operational procedure in the embodiment of the invention.

Each of the units, when receiving the random address generation request message at the outdoor control means 16 or indoor control means 24 through the communication means 22, generates a random value at the random value generation means 23 under the control of the indoor control means 24 and outdoor control means 16 and sets the random value as its own address. Further, the unit transmits its own address to the unit having an address of 1-0, i.e., the outdoor unit 1a. At this time, when the unit for the address to be transmitted is an outdoor unit the random address is set as the group address; whereas, when the unit for the address to be transmitted is an indoor unit the random value is set as the unit address (refer to FIG. 4B).

The outdoor control means 16 of the outdoor unit 1a first collects the addresses received from the respective units to find the total number $N_{MAX}$ of indoor units and the total number $L_{MAX}$ of outdoor units. $L_{M1}$ denotes a value corresponding to $L_{MAX}$ minus 1. Then the outdoor control means 16 performs address collation, that is, performs the address collation over the respective units L (outdoor units) and N (indoor units) to see whether or not there are a plurality of identical addresses. When determining the presence of the overlapped address, the outdoor unit 1a again the random address generation request message to re-set the random address setting.

Figure 4C:
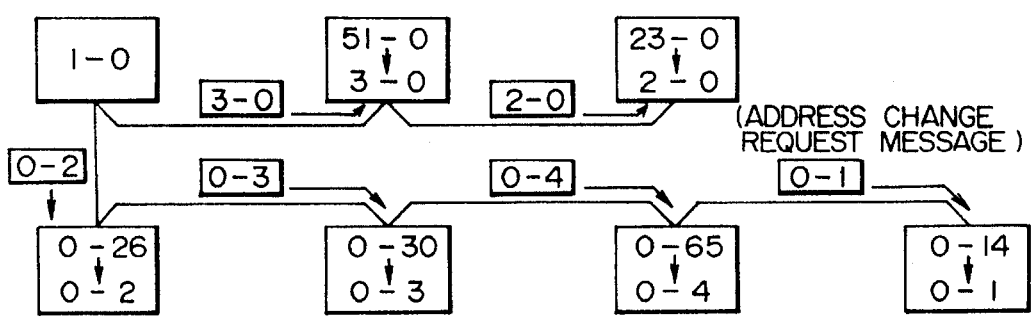
FIG. 4C is a diagram for explaining an operational procedure in the embodiment of the invention.
Figure 5A:
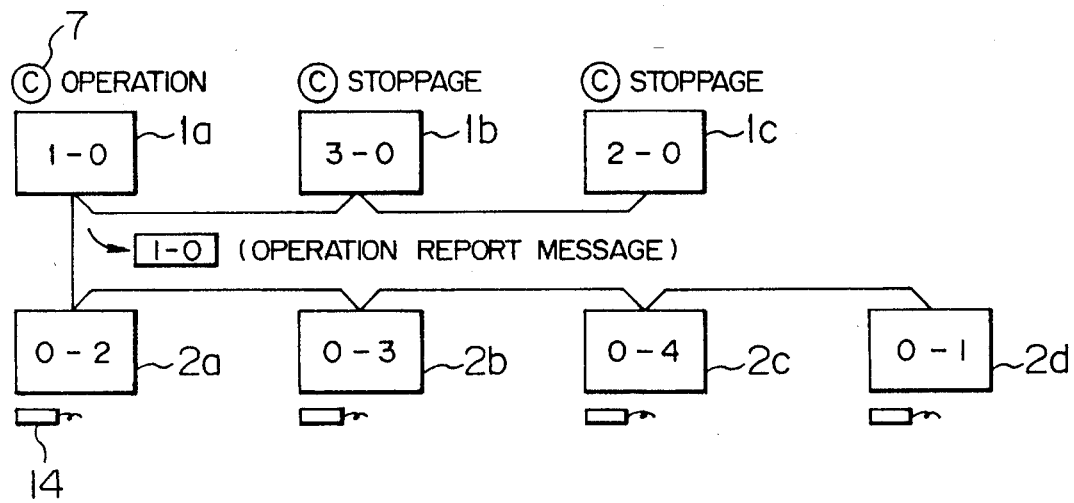
FIG. 5A is a diagram for explaining an operational procedure in the embodiment of the invention.
Figure 5B:
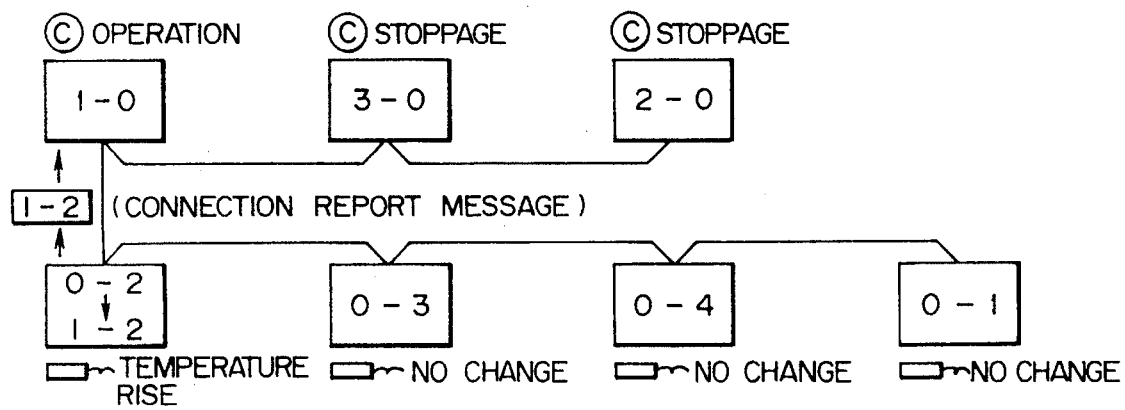
FIG. 5B is a diagram for explaining an operational procedure in the embodiment of the invention.
Figure 5C:
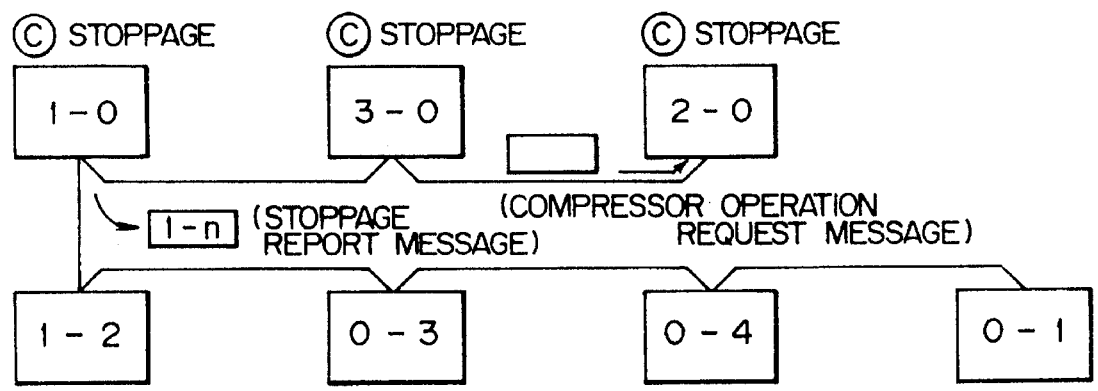
FIG. 5C is a diagram for explaining an operational procedure in the embodiment of the invention.
Figure 5D:
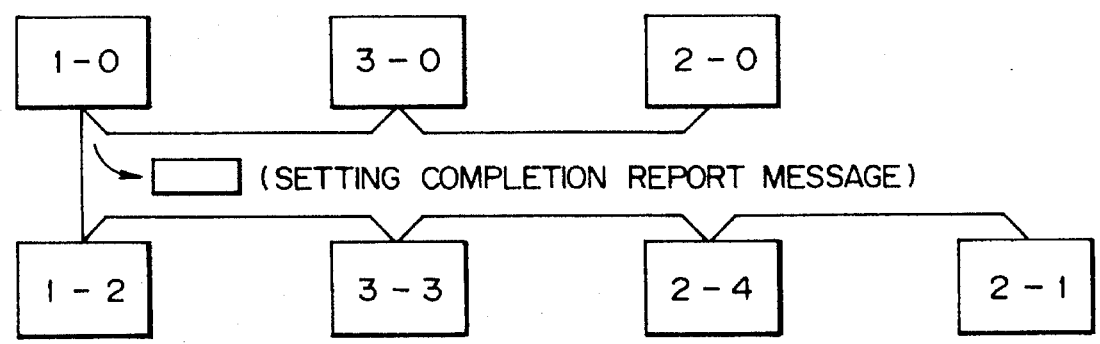
FIG. 5D is a diagram for explaining an operational procedure in the embodiment of the invention.
Figure 6A:
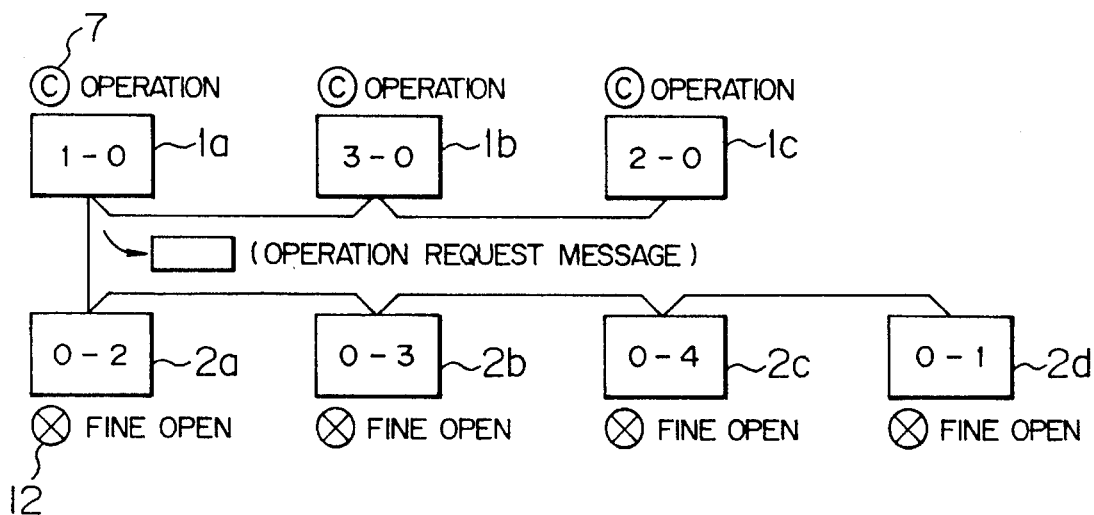
FIG. 6A is a diagram for explaining an operational procedure in the embodiment of the invention.
Figure 6B:
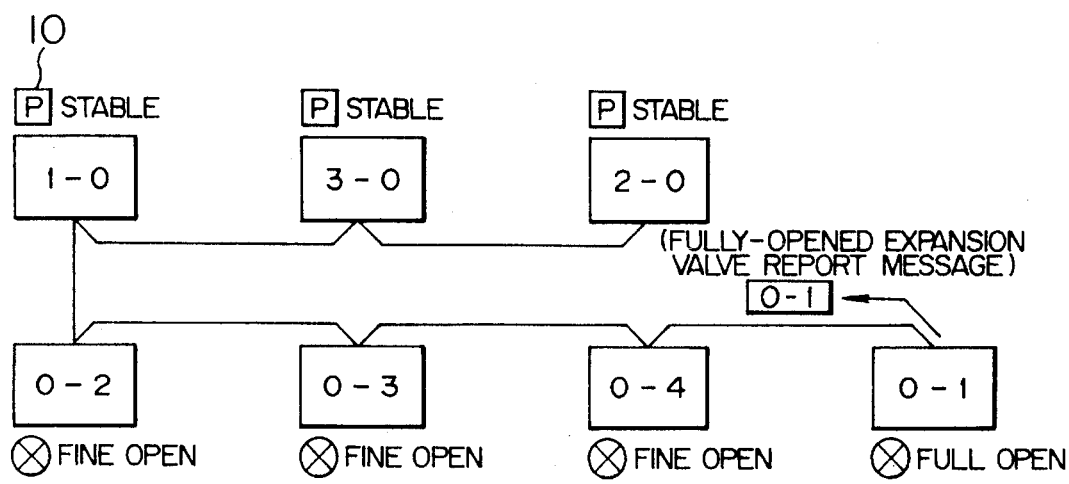
FIG. 6B is a diagram for explaining an operational procedure in the embodiment of the invention.
Figure 6C:
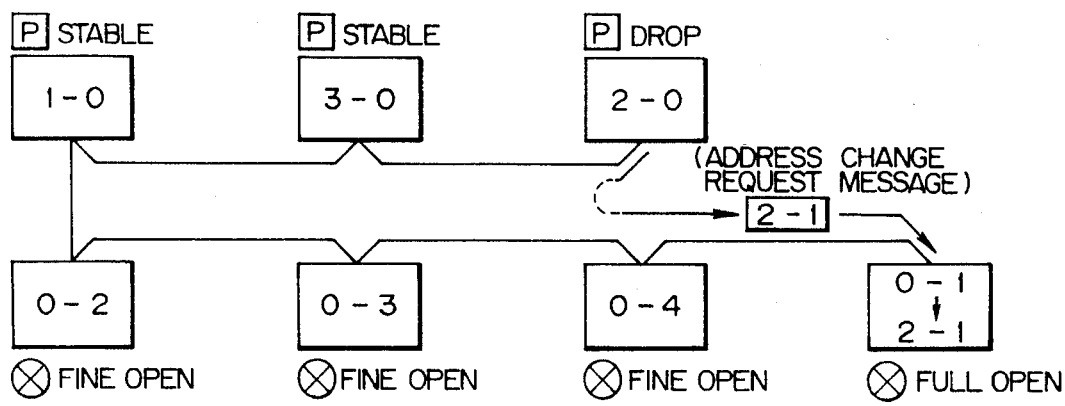
FIG. 6C is a diagram for explaining an operational procedure in the embodiment of the invention.
Figure 7:
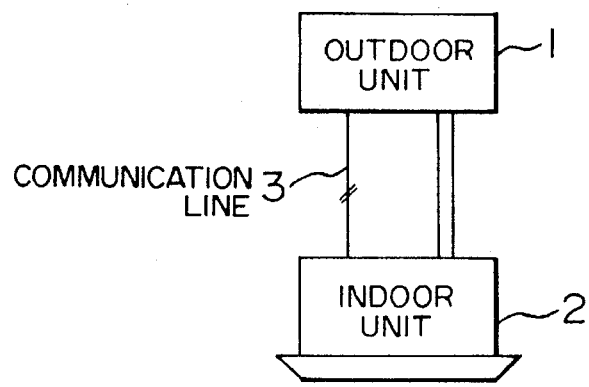
FIG. 7 is a prior art communication line wiring diagram of a single type air conditioner system.
Figure 8:
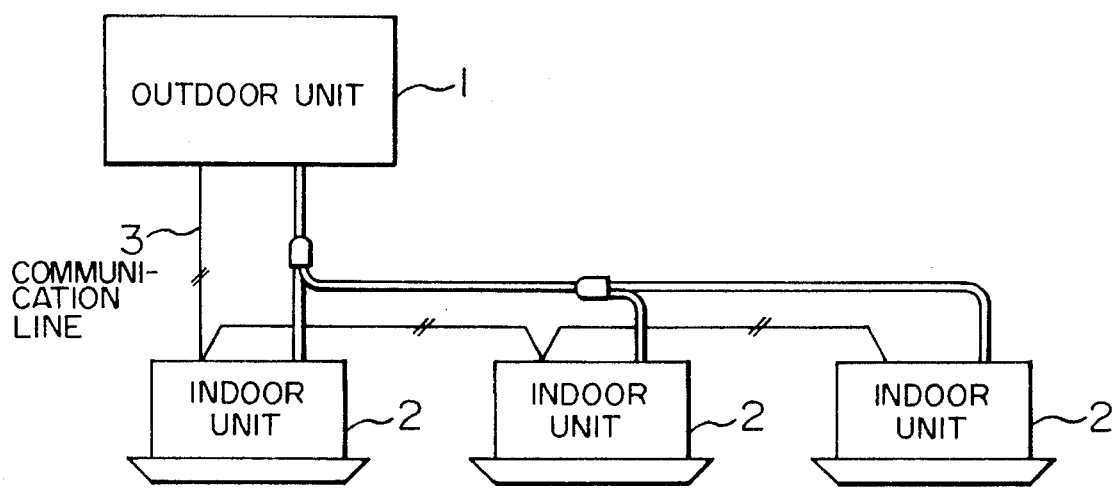
FIG. 8 is a prior art communication line wiring diagram of a multiple type air conditioner system.
Figure 9:
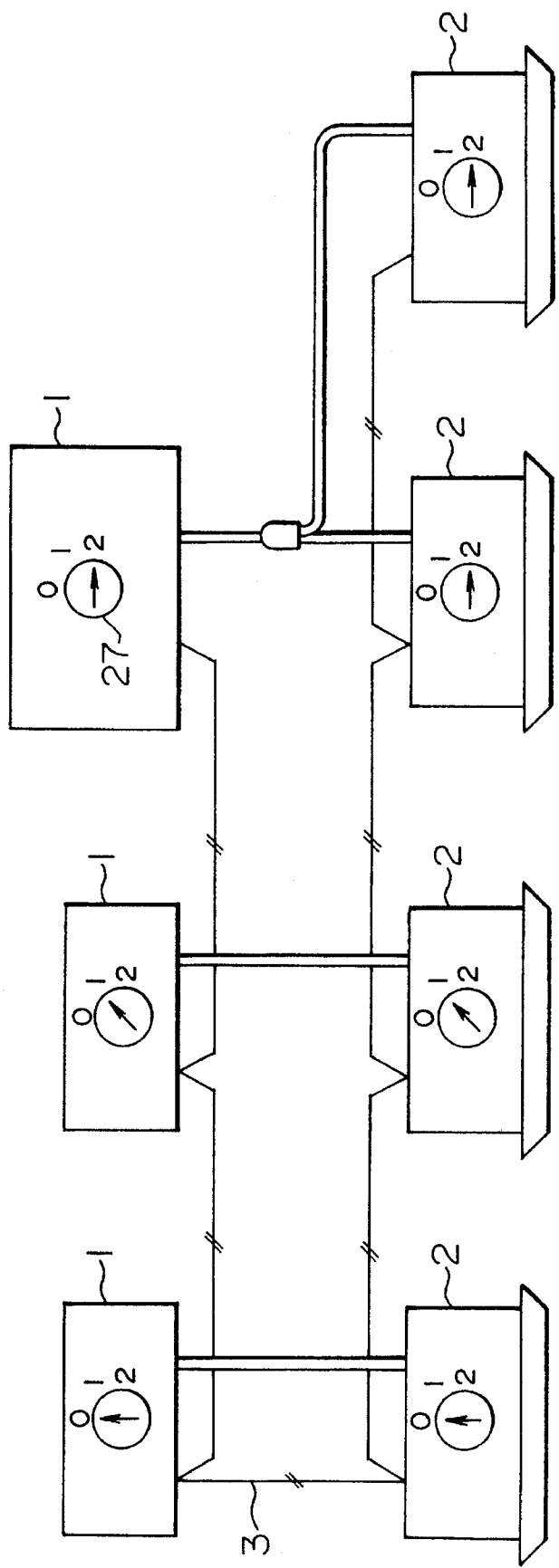
FIG. 9 is a prior art communication line wiring diagram of a bus type air conditioner system.

When determining the absence of the overlapped address, the outdoor unit 1a requests the respective units to have addresses corresponding to a series of consecutive numbers. That is, the outdoor unit 1a re-arranges the addresses of each of the indoor and outdoor units in an ascending order on the basis of the dummy addresses applied to the respective units. The outdoor unit 1a then creates new addresses arranged in order starting from 1 with respect to the above re-arranged addresses and sequentially transmits the new addresses to the respective units as address change request messages. The above procedure is repeated by the number of times of the indoor and outdoor unit numbers $N_{MAX}$ and $L_{MAX}$. However, in the illustrated example, the outdoor unit 1 is fixed to the outdoor unit having the switch turned ON. As a result, for example, the outdoor unit 1a transmits such an address change request message as to change to 0-1 to the indoor unit having the smallest address (refer to FIG. 4C). Through the above operation, the group addresses of the respective outdoor units and the unit addresses of the indoor units are determined.

Next, explanation will be made as to how to provide group addresses to the respective indoor units in conjunction with FIGS. 5A to 5D, 11A and 11B. Like FIGS. 10A and 10B, steps 234 to 248 show the control operation of the other outdoor units during the operation of the outdoor control means 16 of the outdoor unit 1-0 having the switch turned ON, steps 324 to 334 show the indoor unit control operation of the outdoor control means 16, steps 116 to 134 show the operation of the outdoor control means 16 of the other outdoor units, and steps 418 to 440 show the operation of the indoor control means 24 of the respective indoor units.

When the address renewal is completed, the outdoor unit 1a switches the 4-way change-over valve 8 to its heating mode side to drive the compressor 7. At the same time, the outdoor unit 1a transmits a drive report message informing that its own unit, i.e., the unit having an address of 1-0 is driving to the respective units as a broadcast message (refer to FIG. 5A).

When the 4-way change-over valve 8 is switched to its heating mode side to drive the compressor 7, this causes gas refrigerant of high temperature and high pressure discharged from the compressor to flow into the associated indoor unit through the refrigerant gas pipe 4. As a result, the temperature of a gas side of the indoor heat exchanger 13 of the indoor unit connected through the refrigerant pipe to the outdoor unit having the compressor in operation is increased. Thus, each of the indoor units, when receiving the drive report message from any one of the outdoor units, activates the indoor heat exchanger 13 or the temperature sensor 14 provided in the vicinity thereof under a command of the temperature sensor input means 26 of its own unit to start its measuring operation. And the indoor unit stores the measured value in the memory means provided within the outdoor control means 16. After passage of a predetermined time, e.g., 3 minutes, the temperature sensor 14 is again used to obtain a measured value and to compare the measured value with the stored one. When a temperature difference between the measured and stored values is larger than a predetermined value, e.g., 5° C., the indoor control means 24 judges that the associated indoor unit is connected via the refrigerant pipe to the indoor unit now in operation. And the indoor unit sets the group address of this outdoor unit as its own group address and thereafter transmits the set address to the outdoor unit as a connection report message. In the case of the present embodiment, since the outdoor unit in operation is the outdoor unit 1a, the indoor unit 2a connected via the pipe to this outdoor unit 1 performs the aforementioned operation (refer to FIG. 5B).

Figure 11A:
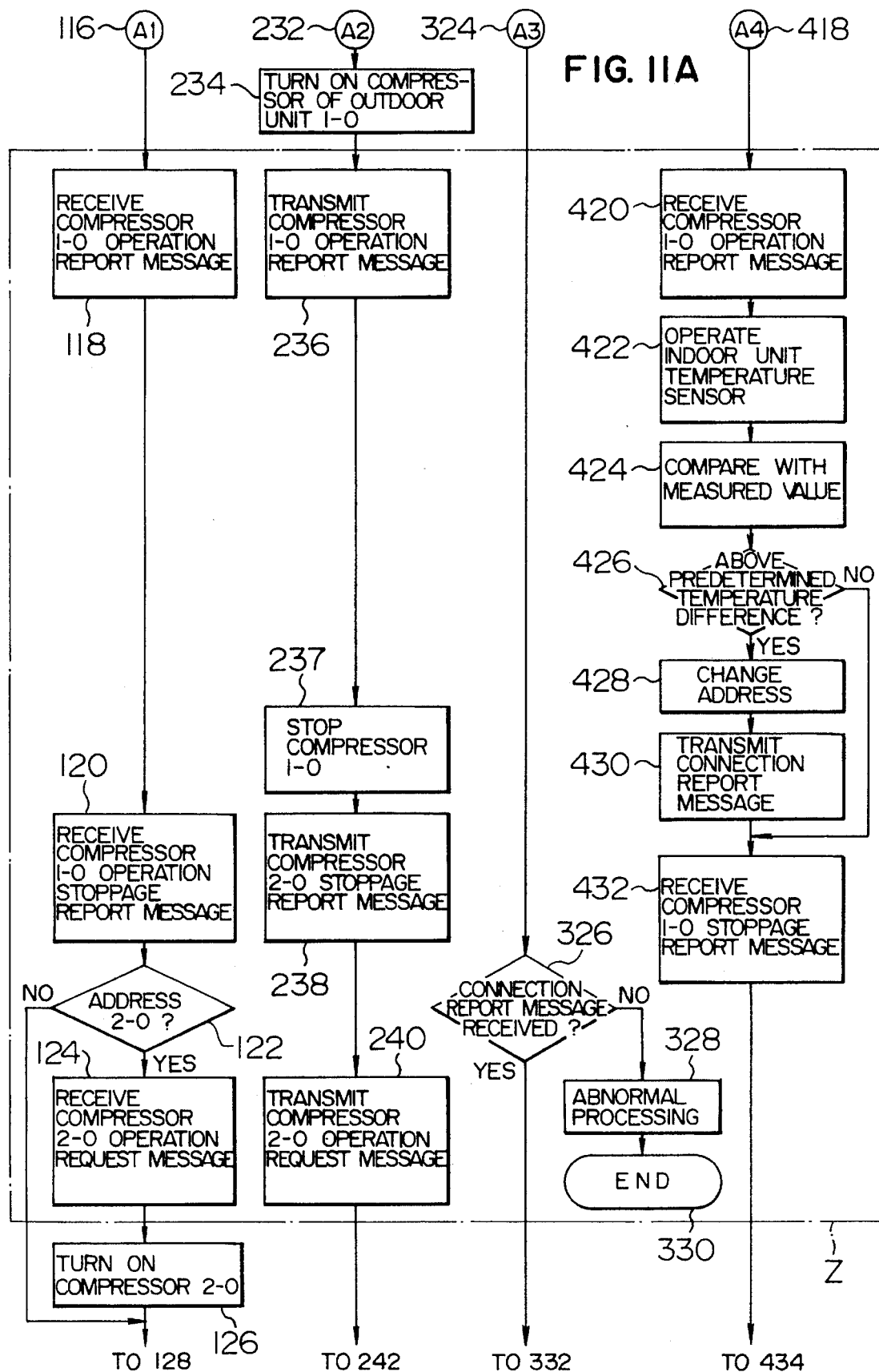
FIGS. 11A and 11B collectively show a flowchart for explaining a group address setting method in accordance with the present invention.
Figure 11B:
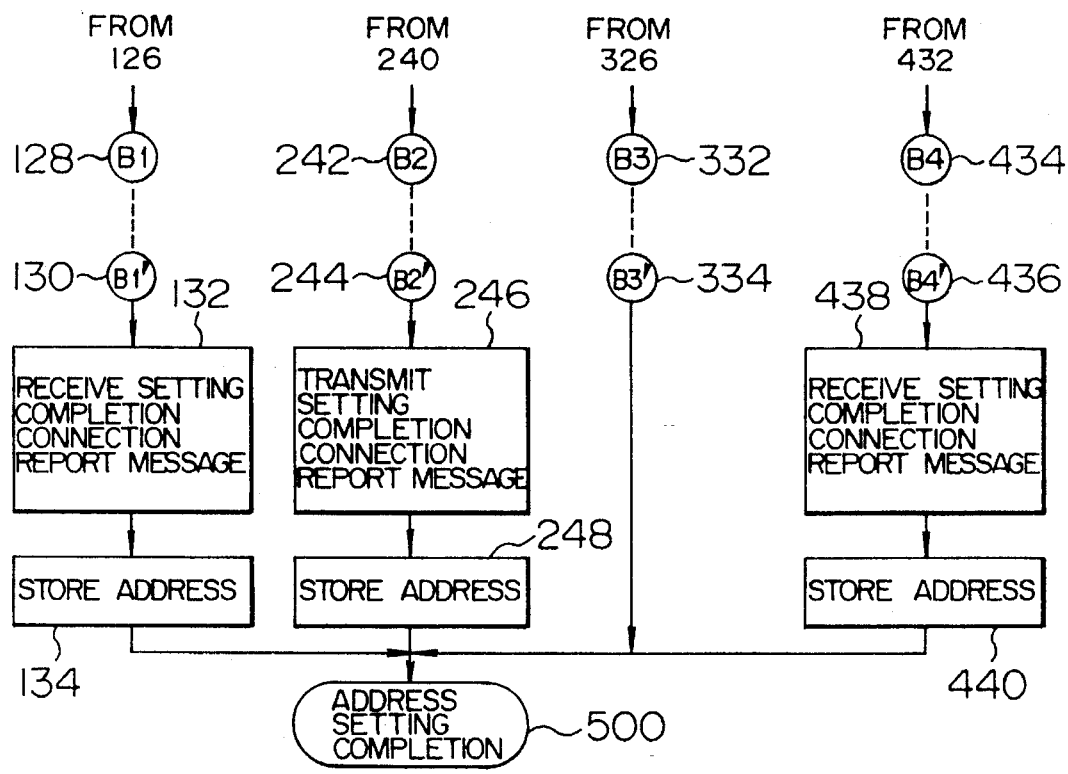
Figure 12:
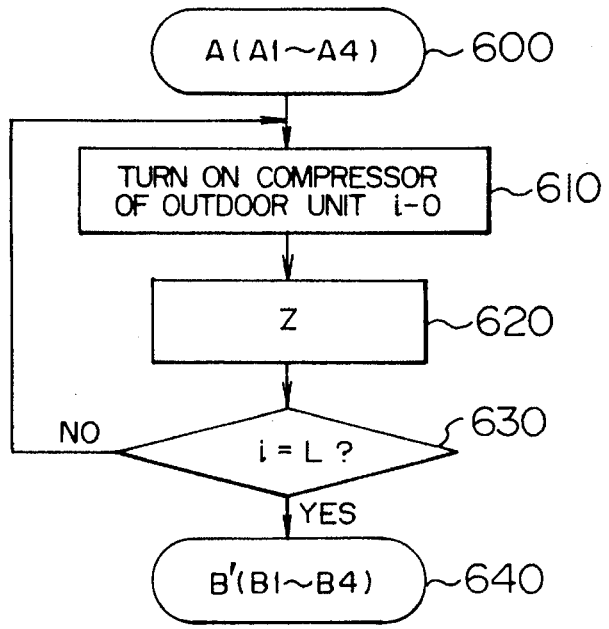
FIG. 12 is a flowchart for explaining the method of the invention.

In the outdoor unit 1a, the compressor 7 is stopped at the moment after passage of a predetermined time, and at the same time, the outdoor unit 1a transmits to the respective units a stoppage report message indicative of the fact that its own unit, i.e., the unit having an address of 1-0 was stopped as a broadcast message. When the outdoor unit 1a fails to receive the connection report message from any of the indoor units, the outdoor unit regards it an abnormal state and performs its abnormal operation to terminate the address setting. When receiving the connection report message from one or more indoor units, on the other hand, the outdoor unit 1a transmits a compressor operation request message to the outdoor unit having the next group address, i.e., the outdoor unit 1c having an address of 2-0 (refer to FIG. 5C). As shown in FIG. 12, each of the outdoor units repeats such operation Z as shown in FIGS. 11A and 11B. More specifically, after the operation of the outdoor unit 1a, the outdoor unit 1c receives a compressor operation request message to perform a series of operation Z similar to the aforementioned outdoor unit 1a and subsequently the outdoor unit 1b performs a series of operation Z. In FIGS. 11A and 11B, the above operation is omitted between terminals B1 and B1'. In this way, the group addresses of the respective indoor unit are sequentially set.

The outdoor unit 1a knows that an address 3-0 is the final address of the outdoor units. Accordingly, when receiving the stoppage report message of the outdoor unit 1b, the outdoor unit 1a transmits to the respective units a set completion report message informing that the address setting was completed as a broadcast message (refer to FIG. 5D). Each unit, when receiving the set completion report message, stores its own address in a nonvolatile address memory means. Through the above operation, a series of automatic address setting operation is fully completed.

Figure 13A:
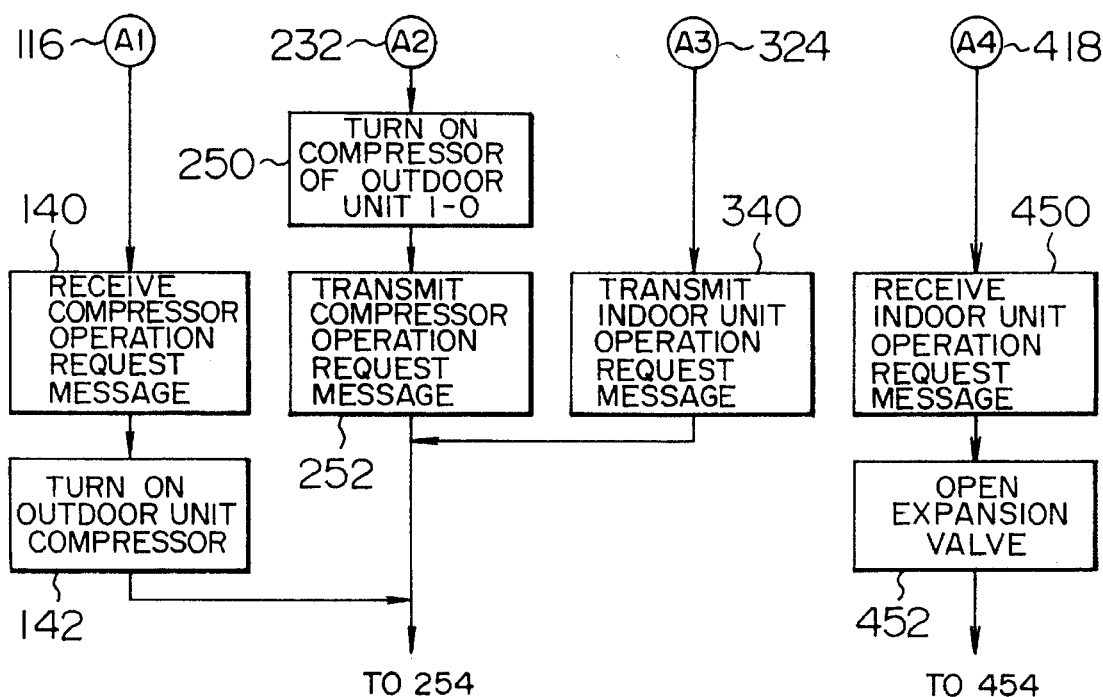
FIGS. 13A and 13B collectively show a flowchart for explaining the method of the invention.
Figure 13B:
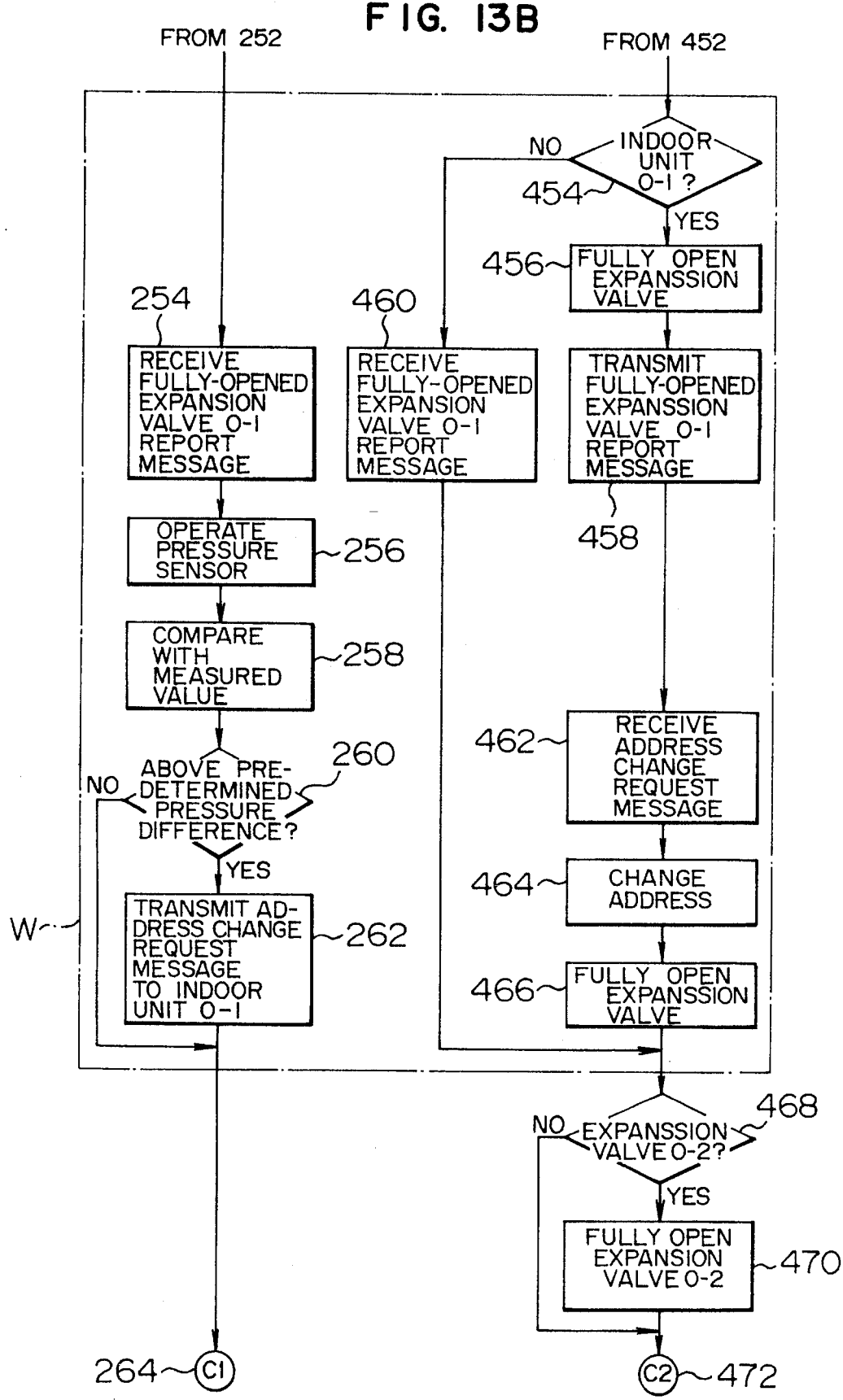

Explanation will next be made as to a method for providing group addresses to the respective indoor units in accordance with another embodiment of the present invention, by referring to FIGS. 6A, 6B, 6C, 13A, 13B and 14. In this case, the procedure until the group addresses of the respective outdoor units and the unit addresses of the respective indoor units are determined is similar to the aforementioned procedure of FIGS. 4A, 4B and 4C. In FIGS. 13A and 13B, steps 232 to 252 show the operation of the other outdoor units during operation of the outdoor control means 16 of the outdoor unit 1-0 having the switch turned ON, steps 324 to 340 show the indoor-unit control operation of the outdoor control means 16 of the other outdoor units, steps 116 to 142 show the operation of the outdoor control means 16 of the other outdoor units, and steps 418 to 472 show the operation of the indoor control means 24 of each indoor unit. Since the respective outdoor units perform the same operation, the respective operations are collectively shown in the steps 254 to 264.

When the address change is completed, the outdoor unit 1a switches the 4-way change-over valve 8 to its heating mode side to drive the compressor 7. At the same time, the outdoor unit 1a transmits a drive request message to the other units as a broadcast message. Each of the other outdoor units, when receiving the drive request message, switches its own 4-way change-over valve 8 to its heating mode side to drive its own compressor 7. The indoor units, when receiving the drive request message, open their electrically-actuated expansion valves 12 by a very small amount (refer to FIG. 6A). Next, the indoor unit 2d having an address of 0-1, after a predetermined time elapses, fully opens the electrically-actuated expansion valve 12 of its own unit and at the same time, transmits to the respective units a fully-open expansion value report message informing that the electrically-actuated expansion valve of its own unit is fully opened as a broadcast message (refer to FIG. 6B).

During operation of the compressor 7 with the 4-way change-over valve 8 switched to the heating mode side, when the electrically-actuated expansion valve 12 of the indoor unit connected via the refrigerant pipe to the outdoor unit having the compressor in operation is switched from the fine open position to the fully opened position, the pressure of gas discharged from the compressor is reduced. For this reason, each of the outdoor units, when receiving the fully-opened expansion valve report message from any one of the indoor units, measures the output value of the pressure sensor 10 of its own unit with use of the pressure sensor input means 20 to monitor a drop in the pressure. In this connection, when the measured value of the pressure is stored in the memory means provided within the outdoor control means 16, comparison of the measured pressure with the stored pressure can be realized. When recognizing a predetermined pressure drop, the outdoor unit judges at the outdoor control means 16 that the indoor unit having the electrically-actuated expansion value now fully opened is connected to its own unit through the refrigerant pipe, and transmits an address change request message to the associated indoor unit. At this time, its own group address is set as the group address for its transmission.

Figure 14:
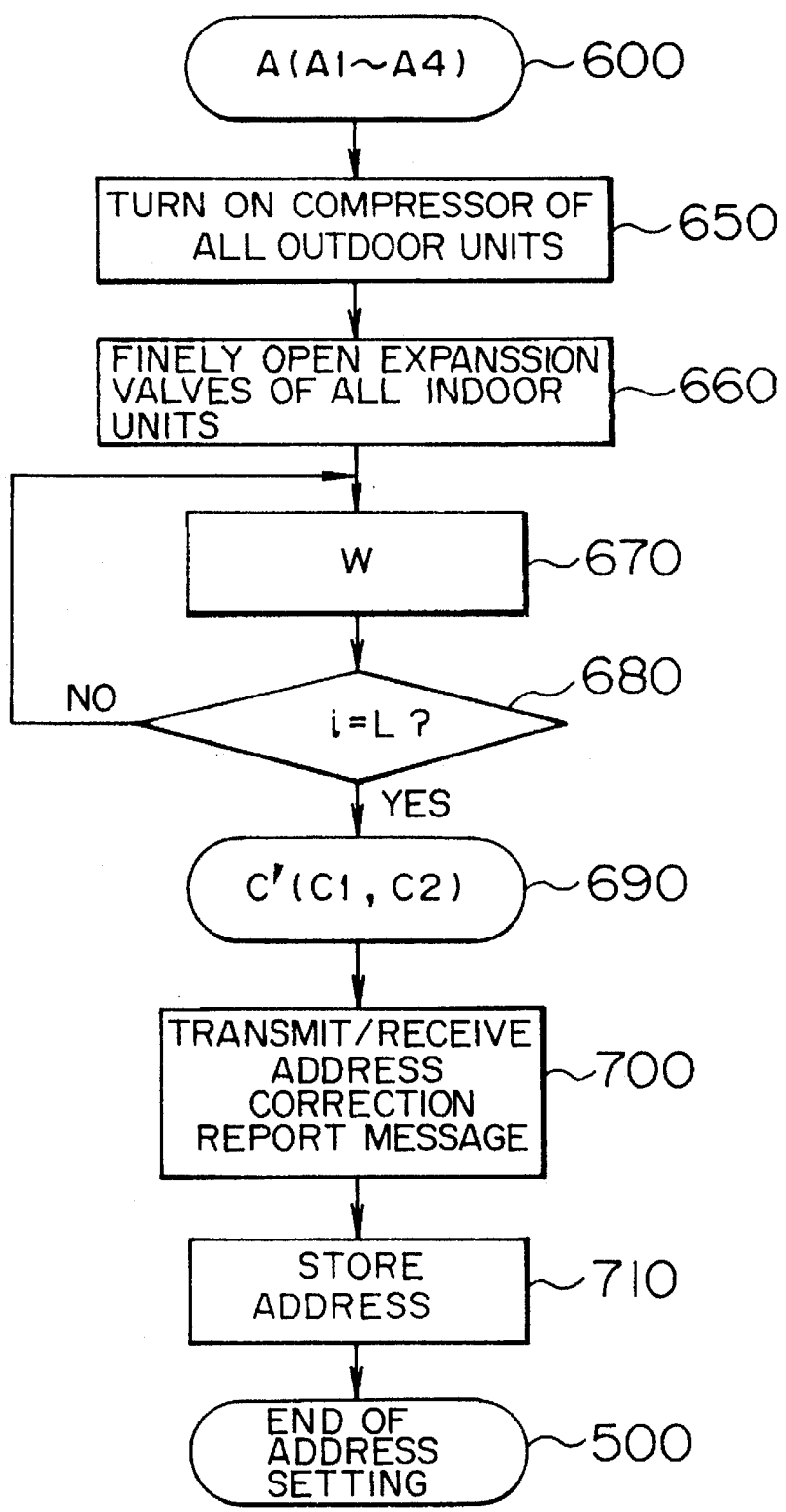
FIG. 14 is a flowchart for explaining the method of the invention.

In the present embodiment, since it is the indoor unit 2d that has the electrically-actuated expansion valve fully opened, the pressure of the outdoor unit 1c connected to the indoor unit 2d through the pipe. And the outdoor unit 1c transmits to the indoor unit 2d a group address report message, i.e., an address change request message (refer to FIG. 6C). Hereinafter, the other indoor units sequentially perform a series of operation similar to the indoor unit 2d in the address order. Such a manner is shown in FIG. 14. Similarly to the aforementioned procedure of FIGS. 5A, 5B, 5C and 5D, group addresses are set for all the indoor units. As already explained above, since not only the group addresses but also the unit addresses are automatically set in accordance with the present embodiment, the need for any manual address setting can be advantageously eliminated.

A further embodiment of the present invention will next be explained. The present embodiment is different from the foregoing embodiment in that the address setting of the outdoor units is attained by the random addresses generated by the respective outdoor units in the foregoing embodiment, whereas, address setting is attained in the order that the outdoor unit 1a receives the drive message from the respective outdoor units after the operation of the outdoor unit 1a in the present embodiment.

More in detail, when the outdoor unit 1a transmits a broadcast message informing of the completion of operation of the outdoor unit 1a to the respective outdoor units, each of the outdoor units transmits to the outdoor unit 1a a message indicating that its own is to be next operated. The outdoor unit 1a validates one of the messages received from the respective outdoor units which first received and invalidates the other messages. When receiving 2 or more messages at the same time, the outdoor unit 1a transmits to the respective outdoor units a broadcast message indicative of a request of re-transmission of the messages. The outdoor unit 1a sets the outdoor unit having generated the first-received message as the next outdoor unit to be next operated, sets its own address ("1 plus 1" in this case) for the to-next-be-operated outdoor unit. The above operation is repeated by the number of times corresponding to the number of all the outdoor units. In this way, address setting for all the outdoor units can be carried out.

FIG. 15 shows an example of various sorts of messages, in which identification code is used for discrimination between the sorts of the messages, sort code is for indicating the message sort (object), and BBC is a redundancy code for bit error detection.

Although the connection judgement has been made on the basis of the temperature of the heat exchanger of the indoor unit or the pressure of the outdoor unit in the foregoing embodiments, the present invention is not limited to the specific example but any connection judgement may be carried out with substantially the same effects as the foregoing embodiments, so long as the judgement reference is such a measurable physical quantity as noise or the temperature of a device other than the indoor heat exchanger, though the effects are somewhat different. Further, the judgement based on a physical quantity may be effected on the basis of its variation value, absolute value, variation slope, integrated value, or the like.

In summary, since piping system group addresses can be automatically set for a plurality of outdoor units and a plurality of indoor units connected in a bus form through a communication line, the present invention has advantages which include the following.

(1) At the time of installing the air conditioner system, the need for conventional installation works for manually setting a group address for each of the units while confirming the connection state of the refrigerant pipe between the outdoor and indoor units can be eliminated. Accordingly, the number of necessary installation work steps can be reduced.

(2) Since erroneous setting of the group addresses caused by an installation worker' setting mistake can be removed, any troubles during the test operation of the system can be reduced.

What is claimed is:

1. An air conditioner system comprising a plurality of outdoor units each having a compressor, an outdoor heat exchanger and a 4-way valve and a plurality of indoor units having an expansion means and an indoor heat exchanger, said plurality of outdoor units are serially connected to said plurality of indoor units through a communication line, each of said outdoor units has an outdoor controller, each of said indoor units has an indoor controller, said outdoor controller includes communication means, outdoor control means for performing transmission and reception of a message to and from the other outdoor and indoor units through said communication means, random value generation means for generating a random address under a command of said outdoor control means, and address control means for storing therein said random address, said outdoor controller includes second communication means, indoor control means for performing transmission and reception of a second message to and from the other outdoor units through said communication means, second random value generation means for generating second random address under a command of said indoor control means, and second address control means for storing therein said second random address.

2. An air conditioner system as set forth in claim 1, wherein said outdoor control means has an outdoor control part for performing transmission and reception of the message to and from the other outdoor units and an indoor control part for performing transmission and reception to and from the message to and from said indoor units.

3. An address setting method for an air conditioner system comprising a plurality of outdoor units each having outdoor control means and a compressor and a plurality of indoor units each having indoor control means and physical quantity detection means, said plurality of outdoor units being serially connected to said plurality of indoor units through a communication line, said method comprising the steps of:

generating, under a command of first one of said plurality of outdoor units, a random address from the other outdoor and indoor units;

receiving said generated random address at said first outdoor unit;

generating a dummy address from said first outdoor unit on the basis of said received random address and assigning said dummy address to the respective outdoor and indoor units;

causing the control means of said first outdoor unit to operate the compressor of said first outdoor unit; and thereafter causing the control means of said plurality of indoor units to judge pipe connection with the first outdoor unit on the basis of a variation in a physical quantity caused by the compressor and detected by said physical quantity detection means provided in each of the indoor units and to update said dummy address.

4. An address setting method for an air conditioner system as set forth in claim 3, wherein said physical quantity is temperature of an indoor heat exchanger.

5. An address setting method for an air conditioner system comprising a plurality of outdoor units each having outdoor control means, a compressor and physical quantity detection means and a plurality of indoor units each having indoor control means and an expansion value, said plurality of outdoor units being serially connected to said plurality of indoor units through a communication line, said method comprising the steps of:

generating, under a command of first one of said plurality of outdoor units, a random address from the other outdoor and indoor units;

receiving said generated random address at said first outdoor unit;

generating a dummy address from said first outdoor unit on the basis of said received random address and assigning said dummy address to the respective outdoor and indoor units;

changing opening of the expansion valve of first one of said plurality of indoor units; and causing the control means of said plurality of outdoor units to judge pipe connection with said first indoor unit on the basis of a variation of a physical quantity caused by a variation of the opening of the expansion valve of said first indoor unit and detected by said physical quantity detection means of said outdoor units and to update said dummy address.

6. An address setting method for an air conditioner system as set forth in claim 5, wherein said physical quantity is pressure of air discharged from said compressor.

7. A multiple type air conditioner system comprising a plurality of outdoor units and a plurality of indoor units, said plurality of outdoor units are serially connected with said plurality of indoor units through a transmission line, each of the outdoor and indoor units includes address memory means for storing therein its own address, random address generation means for generating a random address to be stored in said address memory means, and update means for updating the random address stored in said memory means.

8. A multiple type air conditioner system as set forth in claim 7, wherein each of said indoor and outdoor units further includes judgement means for judging a refrigerant-pipe connection relationship between said outdoor and indoor units on the basis of an output of physical quantity measurement means provided in said indoor units, and said address update means updates the address stored in said memory means on the basis of an output of said judgement means.

9. An address control method for a multiple type air conditioner system comprising a plurality of outdoor units and a plurality of indoor units, said plurality of outdoor units being serially connected to said plurality of indoor units through a transmission line, said method comprising the steps of:

causing each of said indoor and outdoor units to generate a random address on the basis of a signal generated by one of said outdoor units;

operating the outdoor unit having said signal generated therefrom and judging one of the indoor units connected through a refrigerant pipe to said outdoor unit on the basis of an output of physical quantity measurement means provided in each of the respective indoor units; and updating said random address on the basis of a judgement result of said judging step.

* * * * *

UNITED STATES PATENT AND TRADEMARK OFFICE
CERTIFICATE OF CORRECTION

PATENT NO. : 5,499,510
DATED : March 19, 1996
INVENTOR(S) : Yoshida et al.

It is certified that error appears in the above-indentified patent and that said Letters Patent is hereby corrected as shown below:

Title page,
Item [73] Assignee, delete "Hitachi Shimizu" and insert --Hitachi Shimizu Engineering Co., Ltd.--

Signed and Sealed this

Thirteenth Day of August, 1996

Attest:

BRUCE LEHMAN

Attesting Officer  Commissioner of Patents and Trademarks